United States Patent Office 3,462,216
Patented Aug. 19, 1969

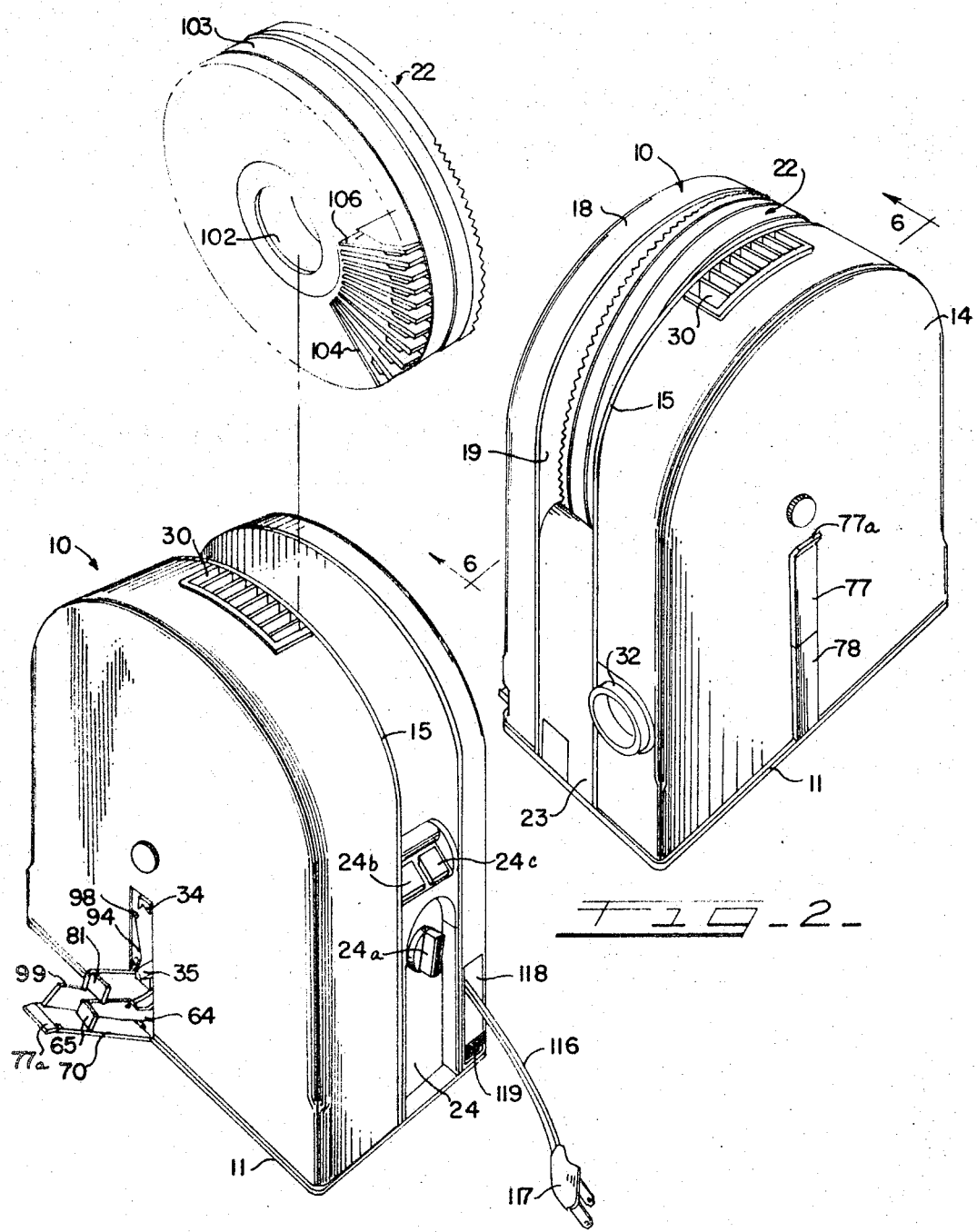

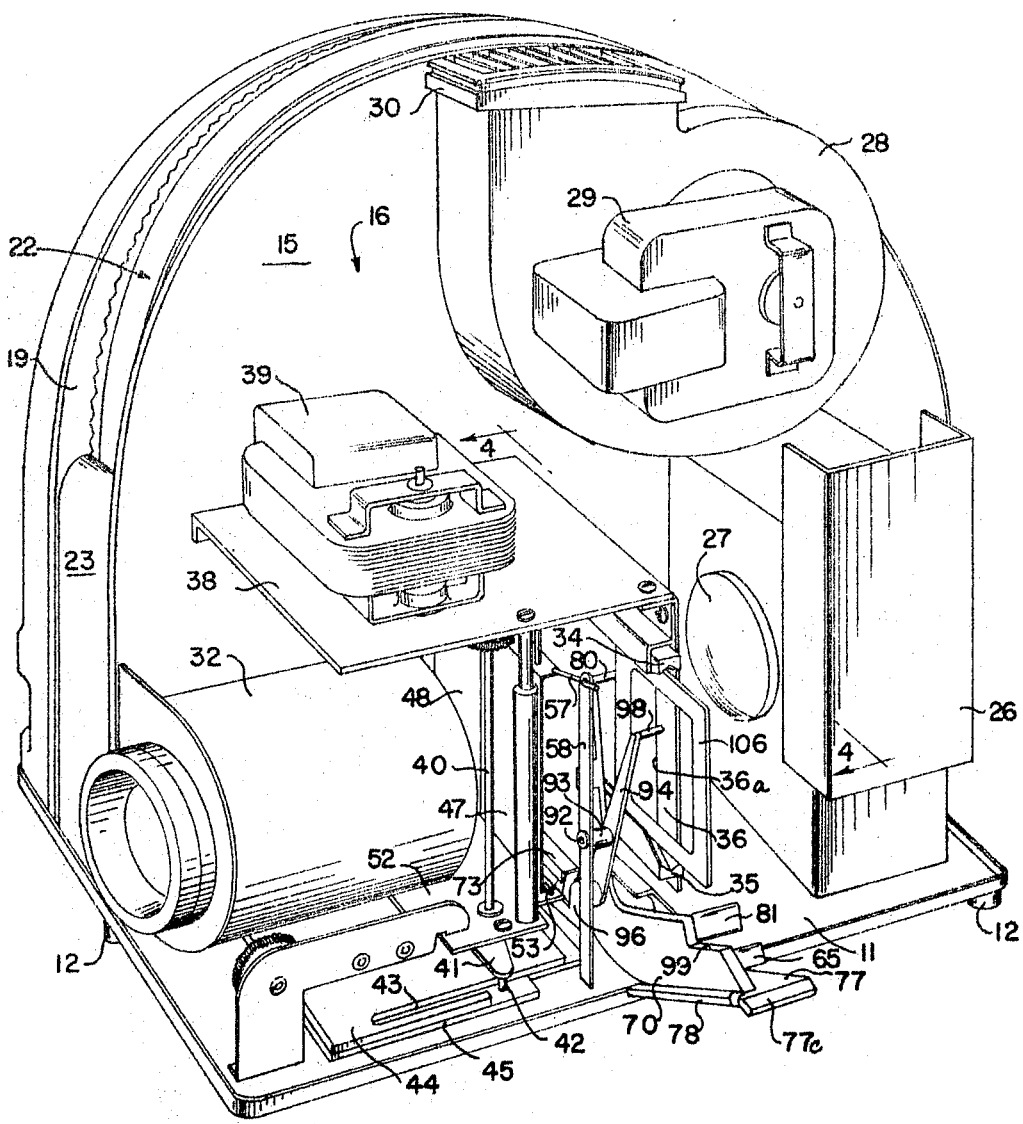

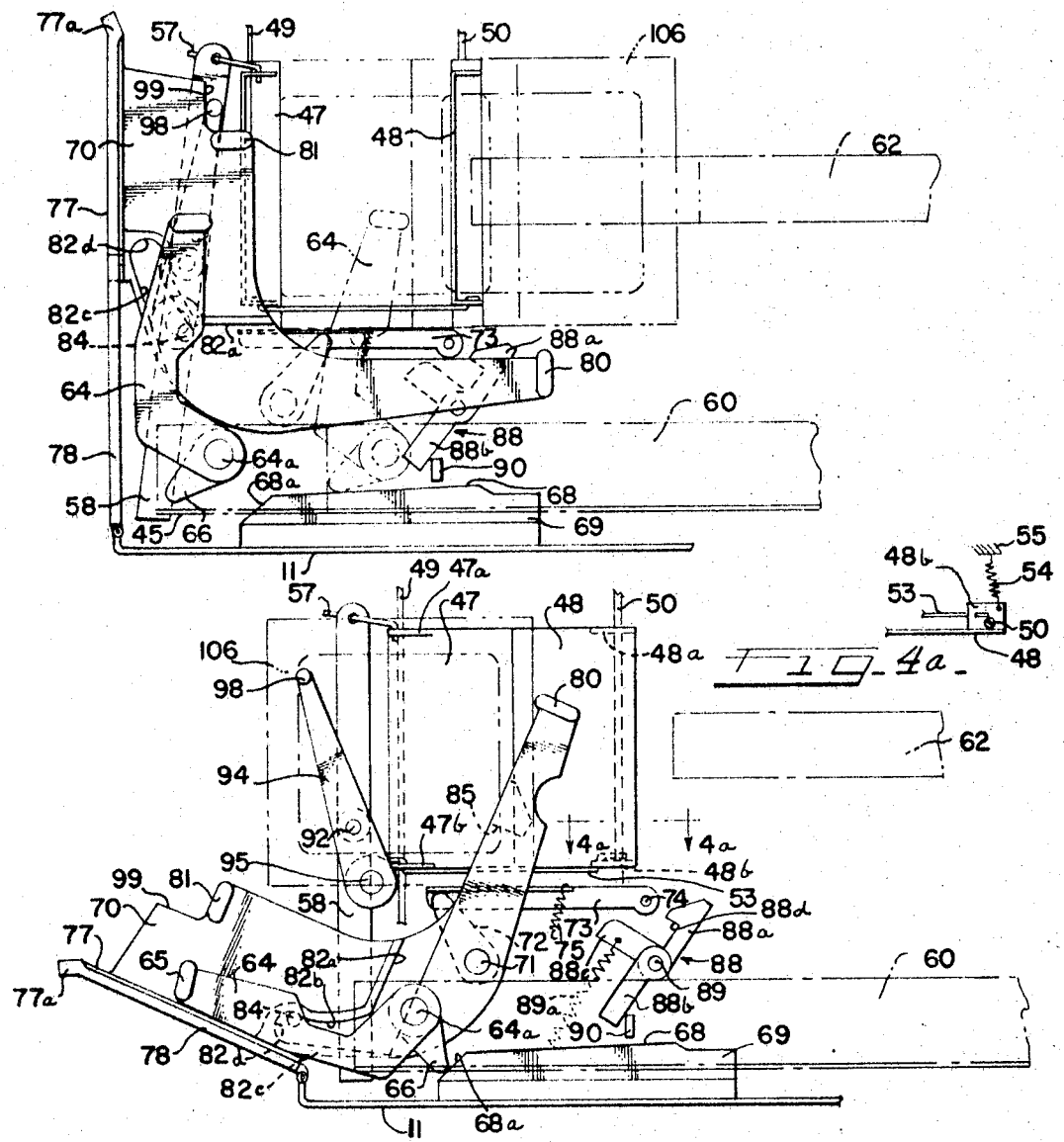

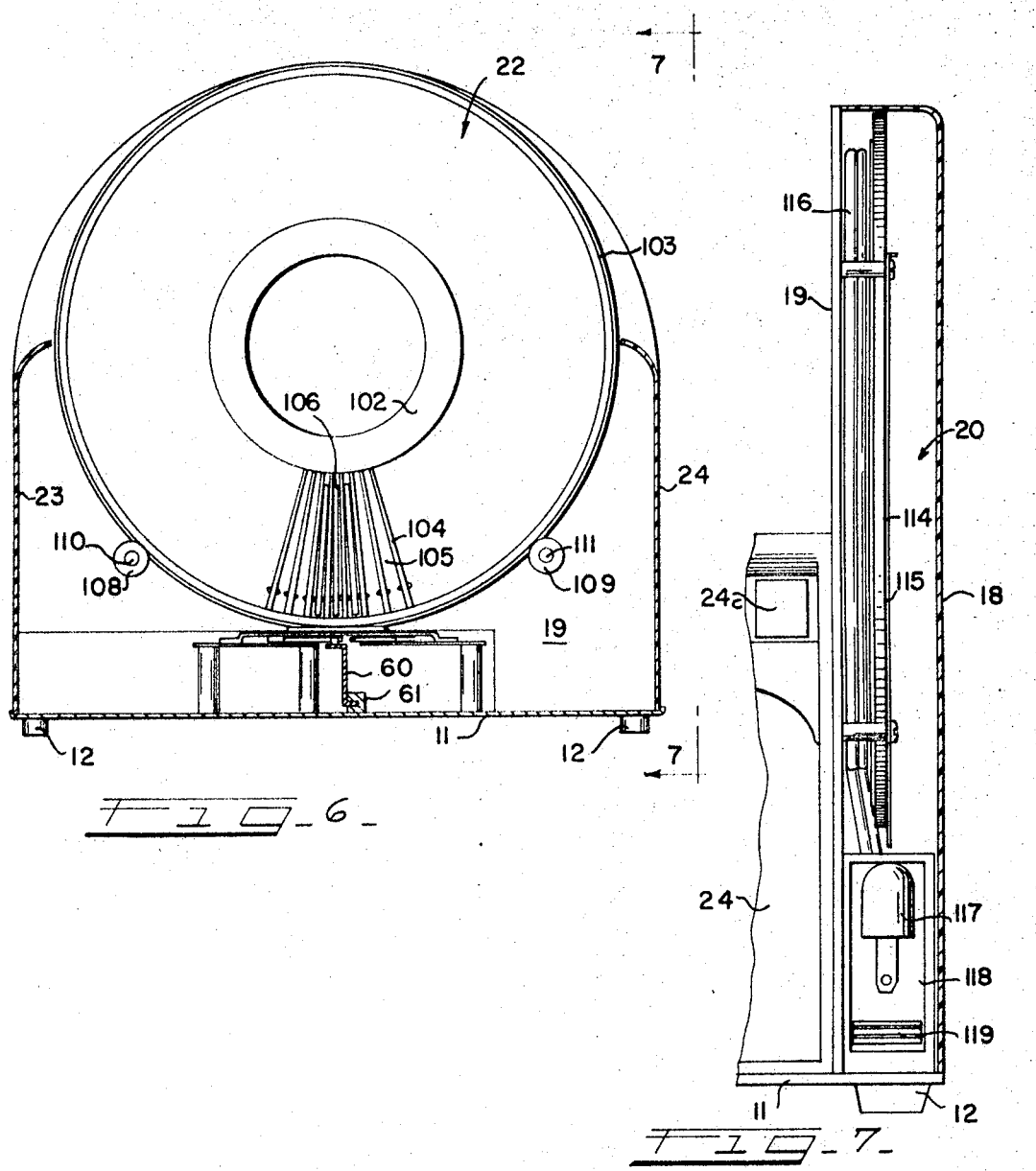

3,462,216
SLIDE PROJECTOR FOR A ROTARY SLIDE TRAY
HAVING A SLIDE EDITING DEVICE
Frank P. Bennett, Northbrook, Ill., assignor to GAF Corporation, New York, N.Y., a corporation of Delaware
Filed Apr. 17, 1967, Ser. No. 631,517
Int. Cl. G03b 23/06
U.S. Cl. 353—117          10 Claims

ABSTRACT OF THE DISCLOSURE

A slide projector having a housing with a slot therein to receive a vertically oriented circular slide tray. The projector includes a slide changing mechanism having pushing and return members engageable with opposite edges of a slide to move the slide to and from the projection gate. A slide editing mechanism permits manual removal of the slide from the gate for editing. The editing mechanism automatically disengages the slide return member to permit exit of the slide from the gate. Dual interlock devices are provided to prevent opening of the editing mechanism except when the slide changer is in its fully inserted position and to prevent movement of the slide changer when the editing mechanism is in its open position. The editing mechanism also operates a shutter for closing the projection gate during editing.

Objects of the invention

A primary object of the present invention is the provision of a new and improved slide exhibitor or projector having features of construction adapting it to accommodate and house the maximum number of components within the minimum amount of space.

Another object of the invention is the provision of a slide projector of the type described which is adapted for receiving and substantially enclosing a circular slide tray in a unique manner.

Still another object of the present invention is to provide a new and improved slide editing mechanism for a slide changing device in a slide exhibiting apparatus, such as a slide projector.

Still another object of the present invention is to provide the aforementioned slide editing mechanism and associated interlock means to prevent jamming of slides.

Even another object of the present invention is the provision of the aforementioned slide editing mechanism and associated means for closing the shutter upon operation of the editing mechanism.

These and other objects and advantages of the invention will become apparent from the following specification disclosing a preferred embodiment of the invention which is shown in the accompanying drawings.

Description of the drawings

FIG. 1 is a perspective view of a projector embodying the present invention, promarily showing the rear and one side of the projector and also showing the circular slide tray disposed above the slot therefor in the projector;

FIG. 2 is a perspective view similar to FIG. 1 and primarily showing the front and one side of the projector;

FIG. 3 is an enlarged perspective view of the projector with a portion of the housing removed for better illustration of the invention;

FIG. 4 is an enlarged, fragmentary section taken along the line 4—4 of FIG. 3 showing the editing mechanism in its edit position;

FIG. 4a is a section taken along the line 4a—4a of FIG. 4;

FIG. 5 is a section similar to FIG. 4 but showing the editing mechanism in its closed position;

FIG. 6 is an enlarged section taken along the line 6—6 of FIG. 2; and

FIG. 7 is an enlarged, fragmentary view taken along the line 7—7 of FIG. 6 with parts of the housing being broken away for better illustration of one of the housing spaces.

Referring now to the drawings, the projector illustrated, generally designated 10, includes a rectangular base plate 11 supported on three or more feet 12 (FIG. 3). The projector further includes a removable housing shell 14, which shell cooperates with an intermediate wall 15 to define a first housing space 16. Another removable housing shell 18 cooperates with a further intermediate wall 19 to define a second housing space 20 (FIG. 7). The intermediate walls 15 and 19 are in parallel spaced relation with each other and define a slot for receiving a circular slide tray or magazine, generally designated 22, which magazine may be of the type disclosed and claimed in the copending application of Walter J. Hall, Ser. No. 461,574, filed May 3, 1965. As noted in FIGS. 1 and 2, wall plates 23, 24 extend between the intermediate walls 15 and 19 adjacent the lower portion of the projector housing. The wall 24 mounts operating controls, such as a knob 24a and push buttons 24b, 24c, for operating the projection lamp, slide changing device and indexing mechanism, respectively. The projector housing may be characterized as having a bottom, front and rear walls, side walls, a generally semicylindrical closed top, and including a slot opening at the top of the projector and also at the front and rear walls adjacent the upper portions thereof, the slot being configured and adapted to receive a circular slide magazine.

Turning now to FIG. 3, and particularly to the various components within the space 16, a lamp housing 26 is mounted on the base plate 11 and encloses a suitable projection lamp (not shown) for projection of light through a lens 27. The lamp is cooled by a blower assembly 28 supported from the intermediate wall 15, which assembly includes a blower motor 29 and an exhaust grating 30, the latter being received within a suitable notch or cutout in the housing shell 14. Also mounted within the space 16 is the usual objective lens assembly 32 which includes lenses movable axially of the optical axis for focusing.

The projection gate in the space 16 is defined by upper and lower slide guides 34, 35, respectively. These guides are of well known construction and include longitudinally extending V-shaped grooves for slidable engagement with the upper and lower edges of a slide to guide the same back and forth between the projection gate and a so-called free position in the slide magazine or tray. The slide guides 34, 35 are mounted on a plate 36 which includes the usual aperture 36a to permit transmission of light along the optical axis, the plate 36 being appropriately mounted to the base plate 11 and the wall 15. The various components defining the projector optical axis or system may be of well known construction and of themselves form no part of the present invention; accordingly, such components are not described in detail herein.

A horizontally disposed plate 38 connected to the wall 15 and the plate 36 mounts a slide changer motor 39. The motor 39 powers a shaft 40, which shaft mounts a crank arm 41 supporting a depending pin 42. The pin 42 is received in a slot 43 formed in a member 44 mounted on a plate 45, such plate being connected to the slide changing device to be referred to hereinbelow.

The mechanism for converting rotary motion of the shaft 40 to reciprocal movement of the plate 45 and the slide changing device may be patterned after the slide changing mechanism shown and claimed in United States Kurz Patent 3,183,774.

Referring particularly to FIGS. 3 through 5, the projector includes a shutter consisting of a pair of shutter plates 47, 48 swingably mounted on respective shutter posts 49, 50. The upper ends of the posts 49, 50 are connected to the plate 38 and the lower ends of these posts are connected to a horizontally disposed plate 52 (FIG. 3), such plate being suitably supported from the partition wall 15. The shutter plate 47 includes a pair of integral tabs 47a and 47b which are apertured to receive the post 49. Similarly, the shutter plate 48 includes a pair of integral tabs 48a and 48b which are apertured to receive the shutter post 50. A stiff wire 53 has opposite ends thereof pivotally received in apertures in the tabs 47b and 48b to provide for swinging movement of the shutter plates 47 and 48 in unison. As noted in FIG. 4a, a spring 54 has one end thereof connected to the tab 48b and the other end thereof connected to suitable fixed supporting structure 55. The spring 54 serves to bias shutter plate 48 to the closed position (illustrated in FIG. 4) and also the plate 47 by reason of the connection defined by the wire 53.

Another stiff wire 57 has one end thereof pivotally received in an aperture in the shutter tab 47a and the other end thereof pivotally received in an aperture in the upper end of a shutter actuating arm 58. The operation of the shutter and the actuating arm 58 will be described hereinbelow in connection with the description of the operation of the slide editing mechanism.

The slide changing device or mechanism includes a lower bar 60 shown in phantom lines in FIGS. 4 and 5 and shown in cross-section and in solid lines in FIG. 6. It will be understood that this bar is mounted for reciprocal sliding movement transversely of the projector housing by suitable means, such as one or more guide blocks 61 (FIG. 6). It will also be understood that the bar 60 is connected to the plate 45 for cycling the slide changing device upon energization of the motor 39. The slide changing device may also be reciprocated manually by means of an operating handle (not shown) connected to the bar 60, which operating handle mounts a horizontally disposed slide pushing bar 62. The parts of the slide changing device not illustrated or described herein, which parts of course form no part of the present invention, may be patterned after the slide changing mechanism shown in Brown United States Patent 3,120,150 or Golden United States Patent 3,130,637.

A slide return arm 64 is pivotally mounted at one end thereof to the bar 60 by means of a pin 64a. The other end of the arm 64 mounts a slide return finger 65 which extends at a right angle from the plane of the arm 64 for engagement with the vertical edge of a slide. The slide return arm 64 includes an integral cam follower 66 arranged for sliding engagement with an inclined cam surface 68 formed on the top of a cam block 69, the latter being mounted on the base plate 11 of the projector. The block 69 includes another cam surface 68a which will be referred to below. Sliding engagement between the cam follower 66 and the cam surface 68 serves to maintain the slide return arm 64 in a generally vertical position (as shown in phantom lines in FIG. 5) for returning a slide from the slide projection gate to the feed position in the slide magazine upon corresponding movement of the slide changing bar 60. When the slide changing device is in its innermost position (disposed fully to the left as seen in FIG. 5) the cam follower 66 is clear of the cam block 69 for permitting counterclockwise rotation of the arm 64 as will be explained hereinbelow.

A slide editing lever 70, of generally right-angle shape, is mounted on a fixed pivot pin 71, the latter being supported by suitable structure, such as the plate 52. The slide editing lever includes an integral follower 72 the end of which follower slidably engages an angle member 73, the latter being pivotally mounted at one end thereof on a pin 74. It will be understood that the pin 74 is mounted from suitable supporting structure of the projector. A spring 75 engaged with such supporting structure and the angle 73 urges the latter in a counterclockwise direction about the pin 74 and thereby serves yieldably to hold the editing lever 70 in either of its positions shown in FIGS. 4 and 5.

The editing lever 70 includes an integral flange portion 77 having one end thereof bent outwardly, as at 77a, to provide a convenient finger-engaging member for swinging the arm 70 outwardly away from the shell 14 as will be appreciated from reference to FIG. 2. The flange portion 77 is slidably received in an elongated, channel-shaped member 78, the latter being pivotally mounted at one end thereof to the base plate 11. It will be understood that the channel 78 serves to close the slot in the shell 14 when the editing lever is in its closed position as noted in FIG. 2.

The slide editing lever 70 includes a slide ejecting finger 80 at one end thereof and a slide return finger 81 adjacent the other end thereof. The editing lever 70 also includes integral flanges defining cam tracks 82a, 82b, 82c, the latter two tracks being joined by a generally semi-circular cam track or surface 82d. The slide return arm 64 includes an integral cam follower or pin 84 adapted to be engaged by the aforementioned cam tracks or surfaces. Further, the end of the editing lever 70 which mounts the finger 80 also supports an integral projection 85 which serves as part of an interlock to be described hereinbelow.

An interlock lever, generally designated 88, is pivotally mounted on a pin 89, the latter being suitably mounted from supporting structure of the projector. The lever 88 includes a first arm 88a, a generally oppositely extending arm 88b and an intermediate arm 88c extending at a right angle from the first mentioned arms. It will be noted that the arm 88a defines a catch surface 88d. A coil spring 89a has one end thereof connected to the arm 88c and the other end thereof fastened to the supporting structure of the projector for urging the interlock lever 88 in a counterclockwise direction as seen in FIGS. 4 and 5. The bar 60 of the slide changing device mounts a projection 90 which engages the arm 88b as the slide changer approaches its innermost position for rocking the interlock lever 88 in a clockwise direction against the force of the spring 89a.

Referring to FIG. 3, it will be noted that the shutter actuating lever is pivotally mounted intermediate the ends thereof on a pin 92, the latter being mounted in a hub 93 formed integrally on a secondary shutter actuating lever 94. The lever 94 is pivotally mounted at one end thereof on a pin 95 (FIG. 4), which pin is fixedly mounted in suitably structure 96 (FIG. 3), the latter being attached to the plate 52. The arm 94 mounts an integral pin 98 at its other end, which pin is adapted to be engaged by a cam surface 99 formed on the editing lever 70 adjacent the return finger 81.

Referring momentarily to FIG. 6, the circular slide magazine 22 will be seen to include inner and outer circumferential walls 102, 103, respectively, mounting therebetween a plurality of radially extending partitions 104 defining a plurality of slide receiving spaces 105 for reception of slides, such as a slide 106 disposed in the lowermost space 105. The magazine 22 is supported by a pair of rollers 108 and 109, which rollers engage the outer cylindrical surface 103 of the magazine 22. These rollers are mounted on cross-shafts 110, 111, respectively, extending between the intermediate walls 15 and 19. The magazine 22 is supported laterally by engagement with the walls 15 and 19. It will be understood that the lowermost slide 106 in the magazine is supported in the so-called feed position for being engaged by the pushing bar 62 for movement of the slide from the magazine to the projection gate defined in part by the upper and lower slide guides 34, 35. Suitable indexing means, such as shown in the aforementioned Brown and Golden patents may be provided for indexing or rotating the magazine 22 in either direction for successively presenting the slides therein to be advanced one at a time to the projection gate, all in a manner known to those skilled in the art.

The operation of the slide editing mechanism and the association slide changing device is as follows:

Assume that the editing lever 70 is in its closed position as illustrated in FIGS. 2 and 5 and assume further that the slide changing mechanism is withdrawn, i.e., moved fully to the right as seen in FIGS. 4 and 5. With the slide mechanism in this position, the projection 90 is clear of the arm 88b and therefore the spring 89a is effective to rotate the interlock lever 88 in a counterclockwise direction for bringing the catch surface 88d into contact with the projection 85 on the editing lever 70, thereby preventing opening of the latter. As the slide changing device is moved inwardly, either manually or by operation of the motor 39, the pushing bar 62 engages the trailing edge of the lowermost slide in the magazine 22, such as the slide 106, and pushes the same into the projection gate defined in part by respective upper and lower slide guides 34, 35. As the slide changer approaches its innermost position, the plate 45 (FIG. 3) strikes the lower end of the shutter actuating lever 58 and rotates the latter about the pin 92 thereby to open the shutter. As noted in FIG. 5, the pin 92 is held stationary by reason of the engagement between the pin 98 and the surface 99 on the editing lever.

Upon return movement of the slide changing device, the plate 45 moves away from the lower end of the lever 58 whereupon the spring 54 (FIG. 4a) serves to close the shutter lates 47, 48. During return movement o the slide changing device, the slide return arm 64 serves to push or return the slide by reason of the engagement of the return finger 65 with the edge of the slide. The arm 64 is maintained in an upright position to return the slide by reason of the sliding engagement between the cam follower 66 and the cam surface 68.

By reference to FIGS. 4 and 5, it will be noted that the cam surface 68 is slightly inclined upwardly for rocking the arm 64 relative to the bar 60 in a clockwise direction during such return movement of the slide changing device. This feature serves to accelerate the arm 64 for "kicking" the slide back into its space 105 in the circular magazine 22.

Turning now to FIG. 5, it will be seen that when the slide changing device is in its fully inserted position, the cam follower 66 on the return arm 64 is separated from the cam surface 68. However, the return arm 64 does not tend to rotate relative to the bar 60 primarily due to frictional engagement between these two members in the region of the pin 64a. Even if the arm 64 should tend to rotate counterclockwise relative to the bar 60 when the slide changing device is in its innermost position, the arm 64 is righted shortly after the slide changing device commences its return movement by reason of engagement of the cam follower 66 with the inclined cam surface 68.

If it is desired to edit a slide in the projection gate, the operator's finger engages the flange portion 77a for rocking or swinging the editing lever 70 in a counterclockwise direction about the supporting pin 71. Such swinging action of the editing lever 70 is possible when the slide changing device is in its innermost position, as the projection 90 on the bar 60 engages the arm 88b and rocks the interlock lever 88 in a clockwise direction for disengaging the catch surface 88d from the projection 85 on the editing lever 70. Swinging of the editing lever in a counterclockwise direction as just described causes the ejecting member 80 to engage the trailing edge of the slide and force the same outwardly through the slot in the shell 14 for grasping by the operator's fingers, thereby providing for manual editing of the slide.

During the just mentioned rotation of the slide editing lever 70, the cam track 82b on the latter engages the pin 84 on the arm 64 and therefore serves to swing the latter also in a counterclockwise direction about the pin 64a. This swinging action of the arm 64 serves to move the return finger 65 out of the way to permit removal of the slide from the gate for manual editing. As noted in FIG. 4, when the editing lever 70 is in its full-open position, the follower pin 84 is received within the arcuate cam track 82d.

As seen in FIG. 5, when the editing lever 70 is in its closed position, the cam surface 99 thereon abuts the pin 98 formed on the secondary shutter actuating arm 94. When the editing lever is opened, i.e., swung in a counterclockwise direction as just indicated, the cam surface 99 moves away from the pin 98. Such action permits movement of the shutter actuating arms 58, 94 and allows the shutter spring 54 to close the shutter plates 47, 48. During the aforesaid movement, the actuating arm 58 actually pivots about its points of contact with the plate 45. This swinging movement of the actuating lever 58 also serves to swing the pin 92 and therefore the arm 94 is in turn swung to the position thereof best illustrated in FIGS. 3 and 4.

Should it be attempted to withdraw the slide changing device when the editing lever 70 is in the open or edit position illustrated in FIG. 4, it will be seen that such movement will be prevented as the cam follower 66 will strike the cam surface 68a upon initial movement of the slide changing device to the right. Accordingly, the cam follower 66 and the cam surface 68a cooperate to define a second interlock for preventing movement of the slide changing device when the lever 70 is in the edit position.

When the editing lever 70 is returned to the closed position, it will be seen that the cam track 82c thereon will come into engagement with the follower pin 84 on the arm 64 and rotate the latter approximately to the position thereof shown in solid lines in FIG. 5. The engagement between the cam track 82c and the follower pin 84 will cause the arm 64 to be rotated to at least to a position wherein the cam follower 66 will slidably engage the cam surface 68 whereupon the arm 64 will be held in a position for returning a slide from the projection gate to the slide receiving space in the slide magazine. As the slide editing arm 70 approaches its fully closed position, the cam surface 99 thereon will strike the pin 98 on the shutter actuating arm 94 thereby opening the shutter for projection of the edited slide. Righting or erecting of the arm 64 will of course position the follower 66 to permit withdrawal or movement to the right of the slide changing device which includes the bar 60. Such movement of the bar 60 causes separation of the projection 90 from the arm 88b thereby permitting the spring 89a to rotate the interlock lever 88 for bringing the catch surface 88d into engagement with the projection 85 on the editing lever 70 for preventing opening of the same.

Referring now to FIG. 7, the housing space 20 serves as a convenient means for housing other components of the projector, such as a cord reel 114. This cord reel may be of the type shown in Bennett et al. United States Patent 1,446,410. It will be understood that the reel 114 includes suitable coil spring means 115 for winding a length of cord 116 on the reel. The cord 116 includes a plug 117 at one end thereof, which plug is received in a cavity 118 when the cord is fully wound on the reel 114. A thumb-actuated lever 119 of suitable construction releasably engages the cord 115 for holding the latter after the desired amount of cord has been unwound from the reel. Releasing of the button 119 allows the spring 115 to wind the cord 116 completely onto the reel. It will be understood that the other end of the cord (not shown) extends into the hub of the reel 114 and makes appropriate electrical connection with the circuitry in the projector.

It should be apparent that the present invention provides a slide projector of unique and extremely compact construction. The housing space 16 defined by the intermediate wall 16 and the shell 14 encloses a substantial number of the slide projector components. The narrower housing space 20 defined by the intermediate wall 19 and the shell 18 provides a convenient space for other components of the projector, such as the cord reel just explained. The walls 15 and 19 define a slot for reception of the circular slide tray 22, the latter being substantially completely enclosed in the projector by merely being dropped into the slot for engagement with the rollers 108, 109. The upper portion of the projector housing is semicylindrical in shape with the radius of curvature being just slightly greater than the radius of the magazine thereby providing an efficient and compact structure and one that is attractive and pleasing in appearance.

The editing mechanism of the present invention provides a convenient means for editing of slides in the gate. Operation of the editing mechanism automatically closes the shutter to prevent projection of the light beam when the slide is removed from the gate for editing. The double interlock prevents operation of the editing mechanism except when the slide changing device is in its fully inserted position and also prevents operation of the slide changing device except when the editing mechanism is in its closed position, thereby eliminating the possibility of jamming of slides in the gate or in the magazine.

While the invention has been shown in but one form, it will be obvious to those skilled in the art it is not to be so limited. On the contrary, the invention is susceptible of various forms and modifications without departing from the spirit and scope of the appended claims.

I claim:

1. In a slide exhibiting apparatus of the type having an open ended gate defined by opposed guides engageable with opposite edges of the slide, means defining a slide feeding area disposed adjacent one end of the projection gate, a slide changing device including pushing and return members engageable respectively with the other opposed edges of the slide for alternately pushing a slide from the feeding area into the gate and returning a slide from the latter to the former, respectively, the improvement comprising, said return member being mounted on said slide changing device for movement back and forth between operable and inoperable positions, and slide editing means adapted to engage said return member for substantially silmultaneously moving the latter to its inoperable position and exposing a slide in the gate for manual withdrawal from the other end of the latter.

2. In a slide exhibiting apparatus of the type having an open ended gate defined by a pair of opposed, parallel slide guides engageable with respective opposite edges of the slide, means defining a slide feeding area disposed adjacent one end of the gate, a slide changer including pushing and return members engageable respectively with the other opposed edges of the slide, said changer being movable back and forth between exhibit and feed positions for alternately pushing the slide from the feeding area into the gate and returning the slide from the latter to the former, the improvement comprising, said return member being mounted on said changer by releasable means for movement of the return member between operable and inoperable positions, a slide editing mechanism movable between closed and edit positions and serving in the latter position to expose a slide in the gate for manual withdrawal from the other end of the gate, said editing mechanism cooperating with said releasable means, upon movement of the former to its edit position, for moving said return member to its inoperable position when said changer is in its exhibit position.

3. The improvement according to claim 2 further defined by, first interlock means including cooperating members on said changer and said editing mechanism, respectively, for preventing movement of the latter to its edit position except when the former is in its exhibit position, and second interlock means including other cooperating members on said editing mechanism and said changer, respectively, for preventing movement of the latter to its feed position except when the former is in its closed position.

4. The improvement according to claim 2 further defined by, a shutter mounted adjacent said projection gate and being movable between open and closed positions, shutter operating means responsive to movement of said changer for opening the shutter when the changer is in its exhibit position and closing the shutter when the changer is in its feed position, other shutter operating means responsive to movement of said editing mechanism for closing the shutter when said mechanism is moved to its edit position.

5. In a slide exhibiting apparatus of the type having an open ended gate defined by a pair of opposed, parallel slide guides engageable with respective opposite edges of a slide, means defining a slide feeding area disposed adjacent one end of the gate, a slide changer including pushing and return members engageable respectively with the other opposed edges of a slide, said changer being movable back and forth between exhibit and storage positions for alternately pushing a slide from the feeding area into the gate and returning the slide from the latter to the former, the improvement comprising, said return member being mounted on said changer and consisting of an arm pivotally mounted adjacent one end thereof for swinging movement back and forth between an operative position wherein the other end of the arm is arranged for engagement with one of the other slide edges and an inoperative position wherein said other end is disposed away from said other slide edge to permit exit of the slide from the other end of said gate, a cam follower on said arm, a cam surface fixedly mounted by said apparatus and arranged to be engaged by said cam follower except when said changer is in its exhibit position, engagement between said cam surface and cam follower serving to hold said arm in the operable position thereof and disengagement of said cam follower from said cam surface serving to permit movement of said arm to its inoperative position, a slide editing lever mounted adjacent said gate for movement between edit and closed positions, said lever mounting a pair of elements alternately engageable with said other slide edges for pushing a slide at least partially out of the gate from the other end thereof and for pushing a slide into the gate from said other end thereof upon movement of said editing lever to its editing position and its closed position, respectively, said lever serving to expose a slide for manual withdrawal when the former is in its editing position.

6. The improvement according to claim 5 further defined by, first and second means on said arm and said lever respectively, which first and second means interengage during movement of said lever to its edit position thereby to move said arm to its inoperable position, said first and second means serving to return said arm to its operable position upon movement of said lever to its closed position.

7. The improvement according to claim 5 further defined by, a shutter mounted adjacent said gate and being movable between open and closed positions, shutter operating means responsive to movement of said changer for opening the shutter when the changer is in its exhibit position and closing the shutter when the changer is in its feed position, other shutter operating means responsive to movement of said editing lever for closing the shutter when said lever is moved to its edit position.

8. The improvement according to claim 5 further defined by, a first interlock including a catch surface on said editing lever, a locking member mounted by said apparatus for movement back and forth between a locked position in which said locking member engages said catch surface and thereby prevents movement of said editing lever and an unlocked position in which said locking member is free of said catch surface thereby to permit movement of the editing lever, an actuating element on said changer engageable with said locking member for moving the same to its unlocked position as said changer approaches its exhibit position and for moving the locking member to its locked position upon initial movement of the changer toward its feed position.

9. The improvement according to claim 8 further defined by, a second interlock defined by said cam follower and a fixed abutment surface, said cam follower being in abutting engagement with said abutment surface when said lever is in its edit position thereby to prevent movement of said changer away from its exhibit position.

10. A slide projector for use only with a circular slide tray of the type having radially arranged partitions defining a plurality of slide receiving spaces opening at a common face of the tray, said projector comprising, a housing including a base, front, rear and side walls and closed at the top thereof, a pair of intermediate walls mounted between said side walls in parallel relation with the latter, said intermediate walls being in parallel spaced relation with each other and defining a slot opening at the top of the housing and at said front and rear walls adjacent the upper portions thereof for receiving said slide tray therein, one of said intermediate walls and the adjacent side wall defining a housing space, means defining an optical system extending longitudinally of the housing between the front and rear walls thereof in the lower portion of said space, which optical system includes a projection gate, a slide changing mechanism including a horizontally reciprocal slide changer for moving slides one at a time back and forth between said gate and a display position disposed between said intermediate walls, support means between said intermediate walls engageable only with the lower peripheral portion of said tray for rotatably supporting the same for one at a time registration of the slide receiving spaces therein with said display position, said slide tray being wholly contained within the confines of said intermediate walls when supported by said support means, which intermediate walls each have a generally semicircular shaped upper portion defined by a radius having a length at least as great as the radius of said tray, said side walls being conterminous with said intermediate walls, said other intermediate wall being spaced from the adjacent side wall for defining another housing space, a cord reel being mounted in said another housing space with the axis of rotation thereof disposed horizontally.

References Cited

UNITED STATES PATENTS

| | | | |
|---|---|---|---|
| 3,138,062 | 6/1964 | Maiershofer | 353—21 |
| 3,180,212 | 4/1965 | Hillegonds et al. | 353—21 |
| 3,209,647 | 10/1965 | Hall | 353—117 |
| 3,336,836 | 8/1967 | Gould et al. | 353—21 |
| 3,343,454 | 9/1967 | Mahoney | 353—21 |

NORTON ANSHER, Primary Examiner

RICHARD M. SHEER, Assistant Examiner

U.S. Cl. X.R.

353—21